Aug. 12, 1952 — C. M. FINKLE — 2,606,328
COMBINED CAR CRIB AND PLAYPEN
Filed Aug. 24, 1948
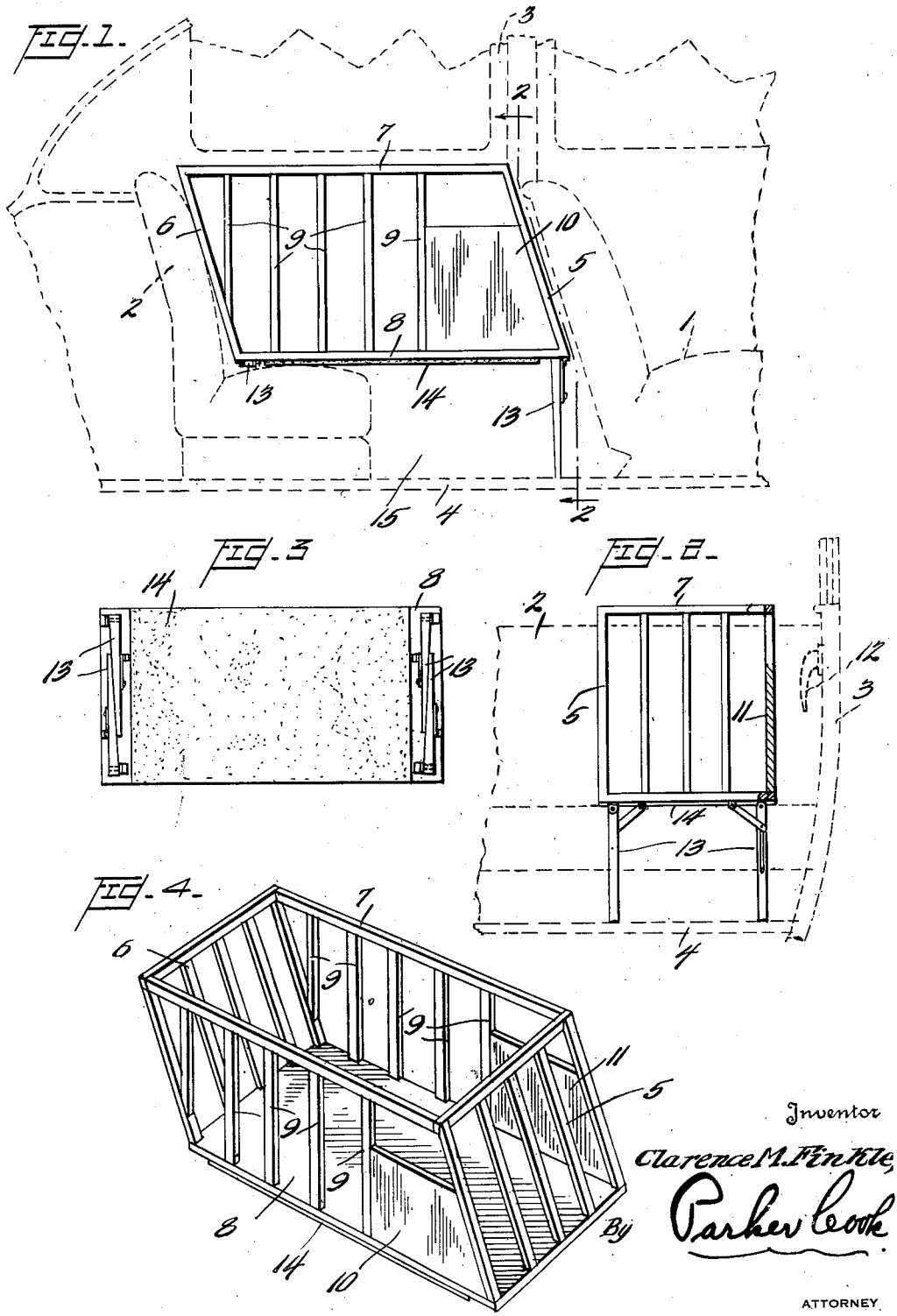
Inventor
Clarence M. Finkle,
By Parker Cook
ATTORNEY Patented Aug. 12, 1952

2,606,328

UNITED STATES PATENT OFFICE 2,606,328

COMBINED CAR CRIB AND PLAYPEN

Clarence M. Finkle, Mansfield Township, Warren County, N. J.

Application August 24, 1948, Serial No. 45,910

1 Claim. (Cl. 5—94)

My invention relates to new and useful improvements in a combined car crib and play pen and has for a primary object to provide a crib that may easily be placed in an automobile so that the same will fit snugly between the rear upright part of the front seat as well as rest on the rear seat and against the upright cushion or back of the rear seat.

Still another object of the invention is to provide a car crib that is provided with foldable legs so that when placed in the back of an automobile the rear portion of the crib may rest on the seat while the front portion of the crib will be supported on the front legs.

Still another object of the invention is to provide a combined car crib and play pen that is provided with side panels in the forward end of the crib which will prevent the child or baby from reaching through the skeleton frame of the pen to manipulate the handle of the door adjacent the crib.

Still another object of the invention is to provide a crib with foldable legs and side panels which crib may conveniently be placed in the rear of the automobile; and likewise when not in use as a crib for the child may be used as an ordinary baby's play pen.

Still another object of the invention is to provide a car crib which may be supported in the front by legs and at its rear by the seat of the automobile, thus leaving space under approximately half of the crib to place luggage, and thus not crowd another occupant who may be riding on the rear seat.

With these and other objects in view, the invention consists in certain new and novel arrangements and combination of parts as will be hereafter more fully described and pointed out in the claim.

Referring now to the drawings, showing a preferred embodiment,

Fig. 1 is a side elevation of the combined car crib and play pen, the dotted lines showing in outline an inside portion of an automobile, Fig. 2 is a sectional view taken on line 2—2 of Fig. 1, the dotted lines showing the door and the position of the handle with respect to the car crib, Fig. 3 is a bottom plan view showing the legs folded and the rubber bottom, and Fig. 4 is a perspective of the crib with the legs folded thereunder.

Referring now more particularly to the several views, and to Fig. 1 for the moment, there is shown in dotted lines the interior of an automobile with its front seat 1, its rear seat 2 and the door 3. There is also shown the floor 4 of the car, the above outline being illustrated to show the adaptability of the car crib for use in an automobile.

Referring now more particularly to the gist of the invention, there is shown the combined car crib and play pen, having the front frame 5 and the rear end frame 6; and it will be noticed that these front and rear frames are at an oblique angle and parallel to each other conforming in angularity to the angularity of the back of the front seat 1 and the back seat 2.

There will also be seen the upper rail 7 and the bottom 8 of the crib, these two members also being parallel to each other, so that in side elevation the combined car crib and play pen is in the shape of a parallelogram.

As may be seen also in the several figures, there are uprights 9 and it will be understood that these might be vertically disposed or disposed at any other desired angles.

Referring to Fig. 4 for the moment, there will be seen near the forward end of the crib a panel 10 on the one side and a like panel 11 on the other side, that extend about three-fourths of the height of the crib, the purpose of these panels being to prevent the occupant of the crib from reaching through the skeleton frame and manipulating the handle 12 shown in dotted lines in Fig. 2. By having these panels 10 and 11 on the opposite sides of the crib, it will be understood that the crib may be placed to either side of the automobile; and, of course, the panels tend to strengthen the construction.

As may be seen in Figs. 1 to 3 inclusive, I also provide foldable legs 13, the height of which is substantially the height of the back seat. These legs may be folded under the crib as shown in Fig. 3 when the crib is used as a play pen; or if it is desired to raise the pen from the floor, the four legs may be unfolded and the play pen then elevated from the floor.

However, when the article is used as a car crib, the front legs only are unfolded so that the crib is supported at its forward end by the legs, whereas the rear of the crib is supported on the cushioned seat 2.

It will also be noticed that I preferably provide a rubber covering 14 on the bottom surface of the crib so that the upholstery of the car will not be marred when the crib is used in the automobile.

It will also be understood, although I have not shown it, that a mattress, of course, may be placed in the bottom of the crib, so that the child can comfortably sleep when confined in the crib, which mattress may be removed at any time if the crib is to be used as a play pen.

It will also be understood that I may make the combined crib and play pen of any desired size, but for practical purposes I have found one that is 36 inches in length and approximately 21 inches in width and 24 inches in height may easily be placed within or removed through the door of the automobile.

It will also be noticed in Fig. 1, that by providing foldable legs for the crib and resting the rear of the crib on the cushion, space 15 is provided in which suit-cases or luggage or packages may be placed, so that if there is another occupant in the car, the luggage will not interfere with the passenger's foot room.

From the foregoing, it will be seen that I have provided a combined car crib and play pen which may be used for the convenient confining of a child while travelling in an automobile, which crib may then afterwards be removed from the automobile to provide a play pen.

Many slight changes might be made without departing from the spirit and scope of the invention.

Having thus described my invention, what I claim is new and desire to secure by Letters Patent is:

A combined non-collapsible and non-foldable car crib and play pen comprising a wooden bottom, front, rear and wooden side frames to provide a solid skeleton formation, wooden panels near the forward end of the crib and extending nearly to the top and disposed in the sides for strengthening the same and adapted to prevent a child from reaching through the frame at the location of the panels, foldable legs secured to the bottom of the crib, the front and rear frames extending at an oblique angle and parallel to each other so that the crib when viewed in side elevation is in the shape of a parallelogram, and the crib adapted to be supported in an automobile at its front by its front legs and at its rear by the rear seat of said automobile and the front and the rear frames adapted to contact with the back of the front seat and the front of the back seat respectively.

CLARENCE M. FINKLE.

REFERENCES CITED

The following references are of record in the file of this patent:

UNITED STATES PATENTS

| Number | Name | Date |
|---|---|---|
| 797,451 | McBryde | Aug. 15, 1905 |
| 1,138,451 | Bugele | May 4, 1915 |
| 1,233,661 | Gordon | July 17, 1917 |
| 1,238,480 | Austin | Aug. 28, 1917 |
| 1,366,405 | MacGowan | Jan. 25, 1921 |
| 1,728,422 | Lundstrom | Sept. 17, 1929 |
| 1,862,383 | Mayette | June 7, 1932 |
| 2,313,834 | Mathaus | Mar. 16, 1943 |
| 2,533,792 | Hall | Dec. 12, 1950 |